Patented Jan. 9, 1951

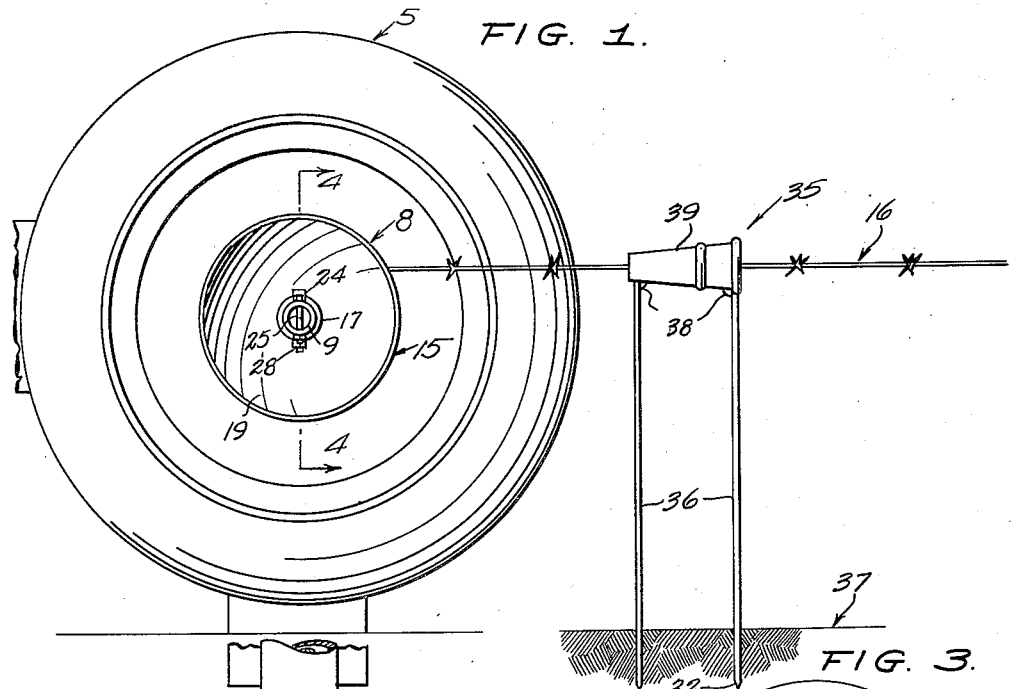
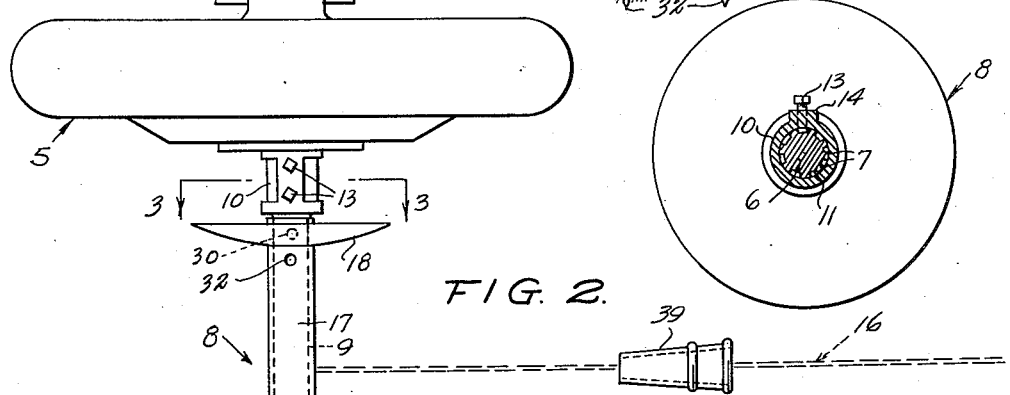
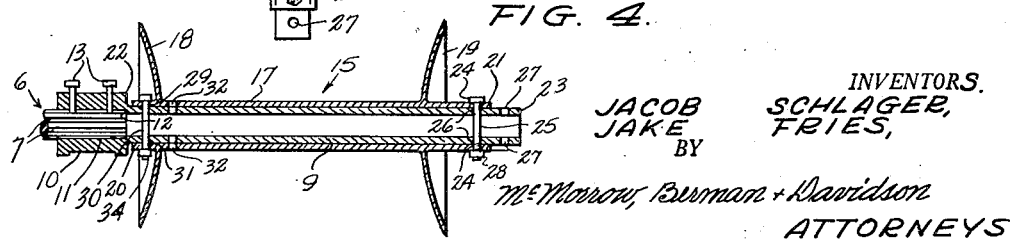

2,537,522

UNITED STATES PATENT OFFICE 2,537,522

WIRE-REELING ATTACHMENT

Jake Fries and Jacob Schlager, Culbertson, Nebr.

Application August 26, 1949, Serial No. 112,532

4 Claims. (Cl. 242—95)

Our invention relates to an improved wire-reeling attachment for tractor wheels or axles and the like, the primary object of our invention being to provide a simpler, more easily operated device of this kind which can be produced at a relatively low cost without sacrifice of efficiency and ruggedness.

Another important object of our invention is the provision of a device of the above-indicated character which is adapted to fit the wheel axles of a variety of tractors of the type usually employed on farms without troublesome or complicated adjustments.

Other important objects and advantageous features of our invention will be apparent from the following description and accompanying drawings, wherein, merely for present purposes of illustration, a specific embodiment of the invention is set forth in detail.

In the drawings:

Figure 1 is an outboard side elevation showing the device attached to a tractor wheel axle and wire reeled thereon through the guide;

Figure 2 is a top plan view of Figure 1;

Figure 3 is a transverse vertical section taken on the line 3—3 of Figure 2;

Figure 4 is a vertical longitudinal section taken on the line 4—4 of Figure 1.

Referring in detail to the drawings, the numeral 5 generally designates a conventional tractor or other motor-vehicle-driven wheel having a power take-off axle 6 projecting outwardly therefrom and formed with a plurality of longitudinal slots or keyways 7, on which axle is removably mounted the wire-reeling attachment 8.

The reeling attachment 8 comprises an extension axle 9 which can be tubular as shown in the drawings, or otherwise, and is formed on its inboard end with a solid tubular enlargement 10 in the form of an axial socket to receive the axle 6. In the form illustrated in the drawings, the bore 11 of the socket 10 is smaller than the bore of the extension 9, so that an internal shoulder 12 is defined for abutment with the outer end of the axle 6. A pair of longitudinally-aligned set screws 13, 13 are threaded through an enlargement 14 on one side of the socket 10 to engage in a selected one of the axle slots 7 and firmly clamp the extension axle 9 on and in axial alignment with the wheel axle 6.

The reel spool 15 on which the barbed or other wire 16 is adapted to be reeled, comprises the tubular portion 17 rotatably and slidably receiving the extension axle 9 therethrough, and the inner and outer axially-spaced, convex-concave spool flanges 18 and 19, which are spaced inwardly from the related inner and outer ends 20 and 21, respectively, of the tubular portion 17. The tubular portion 17 is shorter than the extension axle 9, so that when the inner end 20 of the reel portion 17 is engaged with the outer end 22 of the socket enlargement 10, the outer end 21 of the reel portion 17 is spaced inwardly from the outer end 23 of the extension axle 9.

The outer end of the reel portion 17 is formed with a pair of diametrically-opposed holes 24, 24 to accommodate a headed bolt 25. The outer end portion of the extension axle 9 is formed with inner diametrically-aligned holes 26, 26 and outer diametrically-aligned holes 27, 27 through which the bolt 25 can be selectively extended and its nut 28 tightened to hold the bolt in place. The inner end of the reel portion 17 is formed with a pair of aligned bolt holes 29, 29 to pass a bolt 30 which is selectively passed through aligned holes 31 and 32 provided in the inner portion of the extension axle 9.

When the reel spool 15 is to be secured non-rotatably on the extension axle 9, as when reeling wire onto the spool, the bolt 30 is passed through the reel axle holes 29, 29 and through either of the paired holes 31, 32 in the inner end of the extension axle 9, and the bolt nut 34 is tightened, as shown in Figure 4. The bolt 25 may, if desired, be similarly used in the holes 26 and 27 at the outer end of the extension axle 9. When the spool 15 is to turn freely on the extension axle 9, as when unreeling wire from the device, the bolts 30 and 25 are removed from the extension axle holes and the reel axle holes 29, 29 and 24, 24 and placed instead through the outer extension axle holes 31, 31 and 27, 27 and the nuts 34 and 28 tightened. This permits the spool 15 to turn freely on and have some endwise movement on the extension axle 9 while being confined on the extension axle 9.

A guide 35 for the wire 16 in reeling operations comprises a pair of vertical, parallel rods 36, 36 having pointed lower ends adapted to be thrust into the ground 37 at the working side of the attachment 8, as shown in Figures 1 and 2, and preferably on a line passing through the middle of the spool 15. Welded at 38 on the upper ends of the rods 36, 36 is a horizontal, forwardly-tapering guide tube 39. The guide tube is adapted to be adjusted to a level slightly above the level of the spool axle 17 with the wire 16 secured to the spool and passing horizontally through the guide tube in reeling operations.

From the foregoing it will be obvious that with the driven wheel 5 jacked up above the ground 37 and the attachment 8 including the guide 35 in place, as shown in Figures 2 and 4, rotation of the wheel and its axle 6 by operation of the vehicle engine will rotate the reel spool 15 and reel the wire 16 thereon. When the device is adjusted as hereinabove explained, for free rotation of the reel spool, the wire 16 can be unreeled freely whether the wheel and its axle 6 are rotating or are stationary, either by driving the tractor along the desired route and thereby laying the wire 16, or with the tractor stationary, pulling the wire 16 over the desired route.

We claim:

1. A wire-reeling attachment for the driven wheel axle of a motor vehicle, comprising an extension axle having a socket on its inward end to telescope onto said wheel axle, means for removably securing said socket on said axle for rotation therewith, a wire spool comprising a tubular axle having spaced spool flanges thereon, said spool axle being shorter than said extension axle and rotatably and slidably journaled on said extension axle, and retaining means acting between the outer ends of said extension and spool axles, said retaining means being adjustable relative to said extension and spool axles to a first position in which said spool is locked against rotation and sliding relative to said extension axle and to a second position in which said spool is freed for rotation and sliding relative to said extension axle and is retained on said extension axle.

2. A wire-reeling attachment for the driven wheel axle of a motor vehicle, comprising an extension axle having a socket on its inward end to telescope onto said wheel axle, means for removably securing said socket on said axle for rotation therewith, a wire spool comprising a tubular axle having spaced spool flanges thereon, said spool axle being shorter than said extension axle and rotatably and slidably journaled on said extension axle, and retaining means acting between the outer ends of said extension and spool axles to retain said reel on said extension axle, and means acting between the inner ends of said extension and spool axles being adjustable relative to said extension and spool axles to a first position in which said spool is locked against rotation and sliding relative to said extension axle and to a second position in which said spool is freed for rotation and sliding relative to said extension axle and is retained on said extension axle.

3. A wire-reeling attachment, comprising a socket arranged to receive a driven axle, means on said socket to removably lock the same on said driven axle, an extension axle projecting outwardly from said socket, a wire-reeling spool comprising a tubular axle rotatably and slidably mounted on said extension axle having spaced spool flanges, means on the outer end of said extension axle for retaining the spool thereon, said spool axle being shorter than said extension axle and formed at its inner end with a pair of diametrically-aligned holes, the inner end of said extension axle being formed with an inner pair of diametrically-aligned holes registrable with the spool axle holes, and with an outer pair of diametrically-aligned holes spaced outwardly from said inner pair of holes, and a pin selectively engageable with said inner and outer pairs of holes, said pin when in said inner pair of holes passing through the pair of holes in the spool axle so as to retain said spool against rotation and sliding relative to said extension axle.

4. A wire-reeling attachment, comprising a socket arranged to receive a driven axle, means on said socket to removably lock the same on said driven axle, an extension axle projecting outwardly from said socket, a wire-reeling spool comprising a tubular axle rotatably and slidably mounted on said extension axle having spaced spool flanges, said spool axle being shorter than said extension axle and formed at its inner end with a pair of diametrically-aligned holes, the inner end of said extension axle being formed with an inner pair of diametrically-aligned holes registrable with the spool axle holes, and with an outer pair of diametrically-aligned holes spaced outwardly from said inner pair of holes, and a pin selectively engageable with said inner and outer pairs of holes, said pin when in said inner or outer pairs of holes passing through a pair of holes in the spool axle so as to retain said spool against rotation and sliding relative to said extension axle, said pin comprising a bolt having a head on one end and a removable nut threaded on the opposite end and having a shank passing through the related holes.

JAKE FRIES.
JACOB SCHLAGER.

No references cited.